United States Patent
Baumgart et al.

(10) Patent No.: US 6,822,012 B1
(45) Date of Patent: Nov. 23, 2004

(54) PEELABLE POLYMERIC COATING COMPOSITION

(75) Inventors: Richard J. Baumgart, Paris, KY (US); Michael A. Dituro, Huntington, WV (US); Frances E. Lockwood, Georgetown, KY (US); Zhiqiang Zhang, Lexington, KY (US); Daniel J. Dotson, Lexington, KY (US)

(73) Assignee: Ashland Inc, Lexington, KY (US)

( * ) Notice: Subject to any disclaimer, the term of this patent is extended or adjusted under 35 U.S.C. 154(b) by 0 days.

(21) Appl. No.: 09/693,366

(22) Filed: Oct. 20, 2000

Related U.S. Application Data

(60) Provisional application No. 60/191,506, filed on Mar. 23, 2000.

(51) Int. Cl.[7] ............................................. C08G 18/28
(52) U.S. Cl. ........................ 521/170; 521/142; 521/146; 521/147; 521/149; 521/155; 524/591; 524/839; 524/840; 528/85
(58) Field of Search .................. 521/142, 146, 521/147, 149, 155, 170; 528/85; 524/591, 839, 840

(56) References Cited

U.S. PATENT DOCUMENTS

| | | | |
|---|---|---|---|
| 3,879,248 A | * | 4/1975 | Kest |
| 4,064,092 A | * | 12/1977 | Burroway et al. |
| 4,071,639 A | * | 1/1978 | Palmer et al. |
| 4,146,511 A | * | 3/1979 | Moriya et al. |
| 4,199,620 A | * | 4/1980 | Edwards et al. |
| 4,421,816 A | * | 12/1983 | Arnold |
| 4,442,259 A | * | 4/1984 | Isgur et al. .................. 524/591 |
| 4,444,802 A | * | 4/1984 | Winters et al. |
| 4,444,803 A | * | 4/1984 | Winters et al. |
| 4,479,981 A | * | 10/1984 | Winters et al. |
| 4,647,309 A | * | 3/1987 | Hayner |
| 4,649,170 A | * | 3/1987 | Reid |
| 4,659,380 A | * | 4/1987 | Winters et al. |
| 4,692,494 A | * | 9/1987 | Sonenstein |
| 4,726,982 A | * | 2/1988 | Traynor et al. |
| 4,842,903 A | * | 6/1989 | Hayner |
| 4,851,043 A | * | 7/1989 | Dotson et al. |
| 4,886,704 A | * | 12/1989 | Kamada et al. |
| 4,988,762 A | * | 1/1991 | Overbeek et al. |
| 4,990,184 A | * | 2/1991 | Dotson et al. |
| 5,081,174 A | * | 1/1992 | VanBuskirk |
| 5,143,949 A | * | 9/1992 | Grogan et al. |
| 5,194,483 A | * | 3/1993 | Kawabata |
| 5,360,504 A | * | 11/1994 | Fell et al. |
| 5,428,095 A | * | 6/1995 | Swidler |
| 5,514,441 A | * | 5/1996 | Pohto et al. |
| 5,516,581 A | * | 5/1996 | Kreckel et al. |
| 5,604,282 A | * | 2/1997 | Grogan et al. |
| 5,608,000 A | * | 3/1997 | Duan et al. |
| 5,616,400 A | * | 4/1997 | Zhang ........................ 428/195 |
| 5,631,042 A | * | 5/1997 | Becker et al. |
| 5,643,676 A | * | 7/1997 | Dobashi et al. |
| 5,716,667 A | * | 2/1998 | Kashiwada et al. |
| 5,719,221 A | * | 2/1998 | Swidler |
| 5,747,572 A | * | 5/1998 | Kashiwada et al. |
| 6,011,107 A | * | 1/2000 | Maxwell et al. |
| 6,099,682 A | * | 8/2000 | Krampe et al. .......... 156/272.6 |

FOREIGN PATENT DOCUMENTS

WO      WO 99/10414      * 3/1999

OTHER PUBLICATIONS

PCT/US98/17681, Publication No. WO 099/10414 by Maxwell for a "Water Washable Protectable Coating" published on Mar. 5, 1999.*

* cited by examiner

*Primary Examiner*—John M. Cooney, Jr.
(74) *Attorney, Agent, or Firm*—Carrithers Law Office; David W. Carrithers

(57) ABSTRACT

This invention relates generally to water resistant peelable protective and decorative clear or pigmented coating compositions and, more specifically, to aqueous and solvent based, polymeric coating compositions which form a protective and/or decorative coating and is removably adheres to a variety of substrates, including automotive paints, metals, glass, vinyl, plastics, concrete, natural and synthetic elastomers, and ceramics. The coatings can be either a flat film on the substrate, or a three-dimensional expandable foamy coating, and can be readily peeled off from the substrate as a whole piece. The coatings may be formulated for temporary or long-term protection depending upon the application. The peelable coatings can be applied as a paint, paste, film, or expandable foam cord whereby the expansion of the foam can be controlled by the formulation and applicator.

29 Claims, 1 Drawing Sheet

PEELABLE POLYMERIC COATING COMPOSITION

TECHNICAL FIELD

This application claims the benefit of a Provisional application No. 60/191,506 filed Mar. 23, 2000.

BACKGROUND OF THE INVENTION

This invention relates generally to water resistant peelable protective coating compositions, and, more specifically, to water and solvent based, polymeric coating compositions which form a protective and/or decorative coating with the ability to adhere to a variety of porous, solid, or liquid substrates, including automotive paints, metals, glass, plastics, vinyl, cloth, paper, asphalt, concrete, porcelain, ceramics, and solutions of water and/or oil, etc. The coatings may be either a flat film on the substrate, or a three-dimensional expandable foamy coating whereby the dimensions of the foamy coating can be controlled by the formulation and applicator to foam an expandable cord. The coating may be formulated for temporary or long-term protection.

DESCRIPTION OF THE PRIOR ART

A demand exists for a coating composition suitable for the temporary protection of the surface of an article through the depositing on the surface of a coating which can be subsequently be easily removed, and more specifically, peeled off, from the surface without altering the surface.

For example, in the case of painted or polished metal manufactured articles such as automobiles, a need exists for such a coating composition to protect the automobile against weathering, contamination from the atmosphere, chemical attack or accidental damage during handling. Moreover, often the paint on the front end of a motor vehicle or around the outer edges of the fenders is chipped or otherwise damaged by rocks or other small hard objects flying from the road. The paint also becomes unpleasantly dirty after driving the vehicle during warm weather due to insects colliding with portions of the auto body or even due to bird droppings. If dead bugs and bird droppings are left to remain on the paint for a prolonged period of time, permanent stain marks may appear even after cleaning of the automotive body surface. The vehicle's body surface may also be scratched by pets, during delivery from the dealership, or even during transportation and storage from shipping.

A need also exists for a temporary, peelable coating for the purpose of decoration, either seasonal or occasional, which is easily applied and removed to items such as windows, doors, walls, paper boards, etc. Is this aspect, a three-dimensional coating film is more desirable to the consumers/users since it offers better visibility and greater design possibilities.

There is also a need for a peelable protective coating which can applied to a painted surface, or coated surface such as chrome or chrome plated plastic, to prevent damage to the paint.

SUMMARY OF THE INVENTION

This invention relates generally to water resistant peelable protective and decorative clear, translucent, reflective, phosphorescent, or pigmented coating composition and, more specifically, to water and solvent based, polymeric coating compositions which form a protective and/or decorative coating on a variety of substrates, including automotive paints, metals, plastics, glass, cloth, paper, asphalt, concrete, porcelain, and ceramics. The coating may be formulated for temporary or long term protection, and may be either flat or foamy looking. The invention also relates generally to water based and solvent based coating composition and their method of application by brush, roll, squeeze tube, crayon, marker, ink pen, foam, jell, paste, spraying, dipping, and as an aerosol. The coating can be applied in a single or multiple layers which adhere to one another without bleeding together. The layers may be separated from one another upon drying enabling the user to position cords or strands of the coating composition for decorative purposes or portraying a written or graphic message; however, over several hours the coating layers will tend to adhere and bond to one another. The coating may be applied using an aerosol filled applicator with a tube or spout of a selected length and width to control the expansion of the foam creating a strand or cord of uniform width and depth. The resulting strand or cord will generally form a smooth sealed exterior skin enclosing a porous interior providing structural integrity thereto.

The present invention provides a decorative, scratch resistant means for protecting the paint, glass, plastic, or metal portions of automotive vehicles during storage and shipping, and against road hazards, debris, bugs, etc. depending upon the particular embodiment selected imparting a tough resistant film characteristic or more elastic film characteristic. The peelable coating may also be formulated to be an excellent insulating material against scratch or damage to individual parts and may used as packaging material to spray or paint particular parts, such as automotive parts or military equipment prior to shipping.

The present invention provides a protective peelable coating which can be applied to a painted or coated surface of a motor vehicle such as an automobile, airplane, boat, snowmobile, motorcycle, or other vehicle forming a removable coating which can be peeled away leaving a fresh paint surface in a condition at least as good as before application of the removable coating.

Moreover, removal of the film often removes dirt and contaminants covering the painted surface. The present invention may also be utilized as a removable protective coating for transporting and storing tools and equipment and applied to the bottom surface of snow and water skis, surfboards, snow boards, and other sporting accessories which require a smooth slick surface for optimum performance. A clear and colorless, tinted, or pigmented coating of up to 100 miles and generally of from about 5 to 50 mils and preferably from 20 to 40 mils and most preferably of about 30 mils may be applied to the goods to be protected in the form of an expandable foam of a particular width and depth depending upon the application. Moreover, logos, writing and other graphic designs may be formed by and/or imprinted on the coatings using paint, ink, dye, or the like, and removed from the substrate by peeling the coating from the substrate surface. For example, an advertisement displayed on an automobile windshied or even the painted portions of the auto. It is also contemplated that multiple layer of coatings may be applied providing means to decorate an object. It is contemplated that an effective amount of micro beads or small glass spheres or other sphericals or particles composed of other materials may be added to the formulation to aid in the release of the coating and may be used alone or in combination with the chemical release agents set forth hereafter.

Accordingly, it is an object of the present invention to provide a clear, translucent, pigmented, dyed, tinted, or illuminative coating for application to a wet or dry metal, plastic, glass, cloth, ceramic, clay, fiber, concrete, brick, rock, cinder block, paper, film, or wood surface, in addition to application directly onto a liquid substrate for the expandable composition can formulated to float.

It is an object of the present invention to provide a peelable coating in which metal flake, powder, or other decorative particles can be embedded throughout.

It is an object of the present invention to provide a peelable coating which can be removably placed upon a solid substrate such as paints, metals, plastics, concrete, natural and synthetic elastomers, and ceramics and used as a means of removably supporting another substrate such as a metal foil, a plastic film, styrofoam, foam product, paper, or one or more additional layers of peelable coating forming a sandwich therewith.

It is an object of the present invention to provide a water based or solvent based peelable coating for use on metal, plastic, glass, paper, or wood surfaces having existing protective coatings of paint, varnish, film, without damaging the existing protective coatings.

It is another object of the present invention to produce a peelable coating which does not damage the surface.

It is yet another object of the present invention to produce a protective coating which will not damage paint, chrome, plastic, fiberglass, or other substrate to be coated therewith.

It is another object of the present invention to produce a coating which is easily to apply as a liquid, foam, jell, paste, semi-solid, or aerosol.

It is another object of the invention to provide a coating embodiment having a foamy characteristic providing a three-dimensional aspect to the peelable coating so that the coating can be seen from an angle yet minimize the amount of pigment and other effective components in the formulation. And the three-dimensional aspect adds to the design possibilities for the consumers/users.

It is another object of the foamy coating embodiment to be applied to surfaces without complicated apparatus.

It is yet another object of the foamy coating embodiment to include a propellant so that the coating can be sprayed from a can as an aerosol.

It is yet another object of the foamy coating embodiment to be applied through an extension tube to control the size and shape of the coating, and offer more structural design to the three-dimensional foams.

It is yet another object of the foamy coating embodiment to be applied at ambient temperature and dry on a surface (becomes non-tacky) within about 5 minutes of application and become peelable from the surface within an hour of the application.

The foregoing objects are accomplished by providing a flat-film peelable coating composition comprising an aqueous polyurethane dispersion in an effective amount ranging of up to 95 percent by weight and generally from between 60 to 95 percent by weight, and more preferably from about 80 to 90 percent by weight; in an effective amount of a solvent in an effective range of up to 50 percent by weight and generally from between about 5 to 30 percent by weight; and a release agent in an effective amount of up to 10 percent by weight and generally ranging from between about 0.1 to 5.0 percent by weight can be used to provide a peelable film having a thickness of up to about 80 mils and preferably from about 20 to 40 mils. Effective amounts of other components such as pigments for color and stability such as titanium dioxide and organic pigments, thickening agents such as acrylic polymers, surfactants such as silicone surfactants, and antifoaming agents, in effective amounts up to 10 percent by weight and preferably from about 0.01 to 5.0 percent by weight, may also be utilized in with the aqueous polyurethane dispersion.

The resulting peelable coating exhibits excellent toughness, gloss, elasticity, resiliency, flexibility, abrasion resistance, and adhesion. It is resistant to impact, weathering, acids, and alkalies. It is a coating which is impervious to water, and is resistant to most of the chemical solvents. It may be applied by brush, roll, spray, extrusion, or dipping.

The foam-type peelable coating composition comprises an aqueous polyurethane dispersion between 75 to 98 percent by weight, more preferably 85 to 92 percent by weight, a release agent of 0.1 to 5 percent by weight, more preferably 2 to 3 percent by weight, a propellant between 5 to 20 percent by weight, and other components such as surfactants, pigments, thickening agents, and anti-skinning agents in effective amounts ranging from 0 to 10 percent by weight. It provides a three-dimensional peelable coating with thickness ranging from 0.1 to 1 inch, more preferably 0.25 to 0.5 inch. The foamy coating embodiment having a glossy or semi-glossy surface preferably utilizes an effective amount of resin content of a polyurethane dispersion generally of 25 percent or more and preferably of about 40 percent or more of solids in order to prevent unwanted porosity and prevent collapse of the foam upon application. Moreover, the three-dimensional aspect of the preferred embodiment is preserved by using a polyurethane dispersion of about 40 percent solids or greater, producing a coating having structural integrity from the moment of application to days and weeks after the application of the coating to the substrate.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 5:
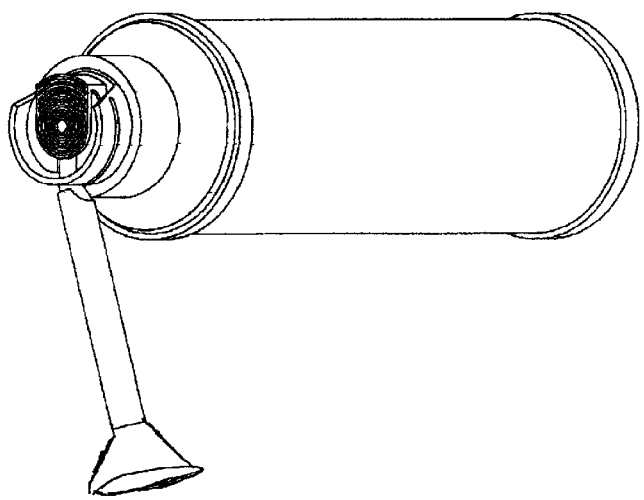
FIG. 5 is a perspective view showing the container, dispenser, and nozzle, of the invention of FIG. 1 including a funnel for spreading and controlling the dimensions of the foam expanding therefrom.
Figure 7:
FIG. 7 is a perspective view showing a portion of generally flattened piece of strand having an ovular cross-section extruded from the expanded foam and showing the smooth outer surface and porous interior structure thereof.

A preferred embodiment of the flat peelable coating composition comprises a film former, a carrier or solvent, and a release agent. Dyes and/or pigments, thickening agents, surfactants, antifoam agents, anti-skinning agents, stabilizers, bactericides, and plasticizers may be incorporated into the peelable coatings formula to enhance particular physical and decorative characteristics of the product.

A preferred embodiment of the foamy peelable coating composition comprises a film former, a release agent, a surfactant profoamer, and a liquid propellant in an aerosol can. Dyes and/or pigments, thickening agents, anti-skinning agents, stabilizers, and bactericides may be incorporated into the peelable coatings formula to enhance particular physical and decorative characteristics of the product.

The polyurethane resin and plasticizer compounds are thermoplastic polymers typically produced by the condensation reaction of a polyisocyanate and an alcohol, more particularly, a hydroxyl-containing material such as polyol derived from polypropylene oxide or trichlorobutylene oxide. The basic polymer unit is formed as follows: $R_1NCO+R_2OH \rightarrow R_1NHCOOR_2$, typically derived from forming "prepolymers" containing isocyanate groups (toluene and 4,4'-diphenylmethane diisocyanates) and hydroxyl containing materials such as polyols and drying oils. Resin dispersions are typically derived from the reaction of polyisocyanates with linear polyesters or polyethers containing hydroxyl groups.

The film former is a polymeric resin, or a mixture of polymeric resins, which form a film after curing or drying. The resin in the preferred embodiments is a polyurethane dispersion, which can be obtained from Bayer, Ruco Polymers, NeoResins, Witco, Reichhold, etc. Other resins such as polyvinyl styrene butadiene copolymers, polyvinyl toluene butadiene copolymers, styrene acrylate, vinyl toluene acrylate copolymers, styrene acrylate copolymers, vinyl toluene acrylate terpolymers, amino-formaldehyde resins, polyvinyl butyral and polyisocyanate resins may be used in combination therewith.

Polyurethane provides a tough but flexible film for use in the peelable coating. The resin selected is preferably UV resistant and may have a stabilizer incorporated therein. The resins may vary in molecular weight and viscosity depending upon the characteristics desired in the resulting peelable coating. Preferred compositions of a film-type peelable coating typically contain a resin in an amount ranging from about 60 to 99 percent, more preferably from about 75 to 95 percent, and most preferably from about 80 to 90 percent by weight of the total weight percent of the composition.

A particularly useful embodiment incorporates the polyurethane within a controlled foam which quickly dries imparting body to the film leaving a smooth outside surface. The term "foam", as used herein, designates a mixture of liquid, gas, and a surfactant that gives the liquid a film strength which permits the formation of long lasting bubbles when the mixture is agitated to convert it into a mass of bubbles. The liquid used is normally water, and the gas is usually air, because these ingredients are of low cost, but other liquid and/or gas can be used when compatible with the surfactant, for example, a pressurized hydrocarbon as the gas component. The strength of the film depends upon the characteristics of the polyurethane dispersion and the surfactant, and the relative amount of liquid and surfactant in the liquid-gas-surfactant mixture.

In the film-type coating embodiment a solvent such as aromatic and/or aliphatic solvents, ethyl, methyl, isopropyl, and butyl alcohol, water, and combinations thereof may be used to provide a carrier for the resin polymer. The amount of total solvent (including the water in the resin dispersion) may range up to about 90 percent by weight, more preferably from about 50 percent to 85 percent by weight, and most preferably from about 60 to about 80 percent by weight of the total weight percent of the composition.

In the foamy coating embodiment no extra solvent is necessary for the formulation; water introduced from the resin dispersion itself acts as the solvent to the system. However, an optional amount of water or other solvent up to the amount of 10 percent by weight may be introduced into the embodiment to enhance the solubility of other components.

One or more release agents and/or aids may be utilized individually or in combination in either the water based or solvent based peelable coating compositions of the present inventions. Preferred release agents include soy lecithin, organosilicone fluids, nonylphenoxypoly(ethyleneoxy) ethanol, oleic acid polyethylene glycol monostearate, petrolatum, sodium alkyl benzene, sulfonates, siloxanes, polyglycols, silicone surfactants, polyvinyl alcohol resins, paraffin and polymeric waxes, and synthetic waxes including low molecular weight polyethylene waxes. It is contemplated that the formulas in the examples set forth herein could utilize any of these release agents wherein the selected release agent depends upon its solubility, availability, and cost and environmental considerations.

A typical release agent used in the examples is soy lecithin which may be defined as $C_2H_{17}O_5NRR'$, R and R' being fatty acid groups. The lecithins are mixtures of diglycerides of fatty acids linked to the choline ester of phosphoric acid and may be classified a phosphoglycerides or phosphatides (phospholipids). Moreover, the lecithin may be a mixture of acetone-insoluble phosphatides of not less than 50% acetone-insoluble matter. The soy lecithin is derived from soybeans.

Thickeners applicable to all of the formulas are utilized to control the application properties of the coating composition, such as sodium polyacrylate, Carbopol EZ-2 (acrylic polymers), Polyox WSR (high molecular weight, (mol. wt.), polymers of ethylene oxide) from Union Carbide, xanthan gums, guar gums, polyacrylic acid, polysaccharides. Fillers such as silica, cellulose, wood flour, and clays may be utilized with the resins of the preferred compositions.

Moreover, a flow resistant component may be used and defined as a thickening agent to impart body in the film coating. Solvent soluble/dispersible compounds which have good film foaming characteristics such as Drewthix (Drew Chemicals) may be utilized independently or in combination with other thickening agents to impart desirable characteristics to the film.

Another water-soluble thickening agent is carboxymethylcellulose (CMC). A preferred embodiment utilizes at least some CMC together with other thickeners such as acrylic polymers. The CMC may be dissolved at about 1.5% in water and be added to the formulation in an effective amount of up to 25 percent by weight, preferably from about 0.01 to 10 percent by weight, and more preferably from about 0.1 to 5.0 percent by weight.

The preferred composition of a film-type coating may contain up to 10% thickeners and more preferably from 0.01 to 8 weight percent thickeners, and more preferably from about 0.1 to 3 weight percent thickeners.

An anti-skinning agent may be added to the formulation and is particularly useful for propellant carried foamy coatings and is preferably used in combination with a foam stabilizer. Typical anti-skinning agents are antioxidants used to inhibit formation of an oxidized film on the exposed surface. The anti-skinning agent provides a means for rapid drying and curing of the foam from the "bottom-up" so that the resulting film dries more quickly and thoroughly and provides a smoother, more glossy appearance having some body. An effective amount of an anti-skinning agent such as Exkin No. 2 up to 1 percent by weight may be utilized in a preferred embodiment, and preferably from about 0.01 to about 0.2 weight percent.

An antifoam agent may be added for the flat coating embodiment to provide a smooth and glossy external appearance to the thin film A high molecular weight silicone oil dissolved in a light petroleum solvent may be used for up to 1 percent by weight, and more preferably 0.01 to 0.1 percent by weight.

In the foamy coating embodiment, a surfactant may be added as an option, in order to enhance the foamability and reduce the bubble size in the foams, in an effective amount of from between 0.01 to about 10 percent by weight, more preferably from about 0.1 to 5 percent by weight, and most preferably about 1 to 2 percent by weight. The term "surfactant", as used herein, refers to surface-active agents which comprise polar compounds consisting of an amphophilic molecule (a molecule with a hydrophilic head attached to a long hydrophobic tail). The hydrophilic group may be anionic, cationic, amphoteric or nonionic. As used in the present invention, the addition of a surfactant to a liquid system reduces the liquid's surface tension and in the presence of gas, promotes foaming. Typical foaming agents include alkanolamides, silicone glycols, alkyl benzene sulfonates, alcohol ethoxylated, phosphate esters, betaines, alkylphenol ether sulfates, alkylaryl sulfonates. Alkanolamide type surfactant is preferably used because it also functions as a foam stabilizer once the foam is formed. It is anticipated that other foam stabilizers such as proteins and fatty acids may be utilized in combination with the surfactants.

A pressurized liquid propellant may be utilized as a carrier to apply the foamed film coating. The preferred embodiments of the present invention use a nonfloronated propellant. A commercial liquid hydrocarbon propellant which is compatible with the preferred composition may be selected from the group of A-31, A-46, A-70, or A-108 propane/isobutane blends, with A-46 and A-70 being the most preferred propellant for use with particular compositions. The composition may contain up to 25 weight percent of the propellant, and more preferably from 5 to 20 weight percent of the propellant.

Moreover, the addition of water soluble resins, fillers, solvents, or plasticizers, such as polyvinyl alcohol, cellulose, and a polyglycol, may assist in the application of the peelable composition to a substrate having a residual amount of water in the form of droplets, a film, or moisture absorbed thereon by combining with the preexisting moisture of the substrate.

Inorganic and organic dye or pigments, preferably pigments, such as the 896 Aqueous Industrial Colorants series, and/or stabilizer/pigment combinations, such as titanium dioxide, may be utilized in an effective amount of up to about 10.0 percent by weight, more preferably from about 0.01 to 5 percent by weight, and most preferably from 0.5 to 2 percent by weight.

Microbiocides, pH control agents, UV stabilizers, etc., may be incorporated in the composition in an amount of from between about 0.01 to about 1.0 percent by weight of the total composition.

In coating embodiments which contain aqueous polyurethane dispersions, no extra plasticizer is necessary since the flat or foamy film formed by the resin already possesses enough plasticity and flexibility. If polymer resins other than polyurethane dispersion are used, a plasticizer may be used to impart flexibility to the peelable coating and impart special physical characteristics to the selected resin such as to facilitate processing and to increase the flexibility and toughness of the final product by internal modification (solvation) of the polymer molecule. Numerous plasticizers are available for utilization in the present invention and may be selected from the group including phthalate, adipates, sebacate esters, and more particularly: glyceryl tri (acetoxystearate), epoxidized soybean oil, epoxidized linseed oil, N,n-butyl benzene sulfonamide, aliphatic polyurethane, epoxidized soy oil, polyester glutarate, polyester glutarate, triethylene glycol caprate/caprylate, long chain alkyl ether, dialkyl diester glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12/PEG-65 lanolin oil, dialkyl adipate, alkylaryl phosphate, alkyl diaryl phosphate, modified trialy phosphate, triaryl phosphate, butyl benzyl phthalate, octyl benzyl phthalate, alkyl benzyl phthalate, dibutoxy ethoxy ethyl adipate, 2-ethylhexyldiphenyl phosphate, dibutoxy ethoxy ethyl formyl, diisopropyl adipate, diisopropyl sebacate, isodecyl oleate, neopentyl glycol dicaprate, neopenty glycol diotanoate, isohexyl neopentanoate, ethoxylated lanolins, polyoxyethylene cholesterol, propoxylated (2 moles) lanolin alcohols, propoxylated lanoline alcohols, acetylated polyoxyethylene derivatives of lanoline, and dimethylpolysiloxane. Other plasticizers which may be substituted for and/or used with the above plasticizers including glycerine, polyethylene glycol, dibutyl phthalate, and 2,2, 4trimethyl-1,3-pentanediol monoisobutyrate, and diisononyl phthalate all of which are soluble in a solvent carrier.

Plasticizers especially useful are differentiated primarily by the molecular weights. The plasticizers are generally classified as formulated aliphatic polyurethane compounds. Either one or a combination of plasticizers of different molecular weights may be used in the formula depending upon the desired viscosity of the coating. Of course, it is contemplated that aromatic polyurethane compounds will also be applicable in the formula for the coating. The amount of plasticizer may range from about 0.1 percent to about 20 percent by weight, more preferably from about 0.5 percent to about 10.0 percent by weight, and more preferably from about 1.0 to about 5.0 percent by weight of the total weight percent of the composition.

EXPERIMENTAL EVALUATION

The following examples are presented to illustrate the claimed invention and are not intended to be otherwise limiting.

A preferred embodiment of a water resistant, peelable, protective and decorative clear or pigmented water based polymeric dispersion coating composition producing a flat film of about 30 mils for use on a variety of substrates, including automotive paints is set forth in Example 1, as follows:

EXAMPLE 1

| INGREDIENT | PERCENT BY WEIGHT |
| --- | --- |
| Aqueous polyurethane dispersion | 60.0–95.0 |
| Solvent | 5.0–30.0 |
| Release agent | 0.1–5.0 |
| Pigment (red, blue, yellow, etc.) | 0–5.0 |
| Thickening agent | 0–5.0 |
| Antifoam agent | 0–1.0 |

The aqueous polyurethane dispersion was mixed with the solvent and the remaining constituents were added thereafter. It should be noted that an important property of the composition depends upon the polyurethane particles being dispersed into water, not dissolved, therefor, the film after cure is not water soluble; instead it is strongly water-resistant. A polar solvent such as alcohol is not required as a carrier since the polyurethane is dispersible in the water rather than being soluble; however, a polar solvent improves the solubility of many of the components. Moreover, no plasticizer is required in the formulation.

The preferred water based compositions include an effective amount of an aqueous polyurethane resin dispersion in a polar solvent such as alcohol. The aqueous polyurethane dispersion is a waterborne, colloidal dispersion of aliphatic urethane. The average molecular weight is between about 50,000 and 5,000,000, more preferably between about 500,000 and 1,000,000, and most preferred about 750,000 to about 850,000. The aqueous polyurethane ranges in amount from about 60 to 95 percent by weight, and more preferably from about 80 to 90 percent by weight. About 82.5 percent of the aqueous polyurethane dispersion by weight was used in Example 1. The aqueous polyurethane dispersion of the preferred embodiment is a water-based dispersion with about 20 to 40 percent by weight solid latex particles, or urethane, and about 60 to 80 percent by weight water. The water in the dispersion provides the majority of the solvent water needed for dispersion of the other components of the composition. Thus, addition of the other components of the formulation into the water dispersion results in the composition of the urethane by weight in the overall formulation to be between about 20 and 30 percent by weight and more preferably about 25 percent by weight in the total formulation. The overall solvent, water and alcohol, composition for the formulation is between about 50 and 85 percent by weight and more preferably about 60 to 80 percent by weight in the total composition.

An effective amount of a polar solvent, such as alcohol was added in an amount ranging from about 5 to 30 percent by weight, and more preferably from about 7 to 20 percent by weight, is included in the composition. About 13.8 percent by weight of isopropanol is included in composition of Example 1; however, ethanol, methanol, butanol, and other alcohol based solvents may be used in the composition.

A release agent such as a soy lecithin in an amount ranging from about 0.1 to about 5 percent by weight, more preferably from about 0.5 to 3 percent by weight, most preferably about 1 to 2 percent by weight of the total weight percent of the composition is utilized in the aqueous polyurethane dispersion Other water soluble or dispersible release agents described heretofore may be utilized with or substituted for soy lecithin.

Additional preferred compositions of the above formulation may be formulated to provide peelable coatings with particular characteristics by blending the compounds as follows.

The above composition may be formed as a clear peelable coating composition or tinted with a dye or pigment in an effective amount of from between about 0.01 to 5.0 percent by weight. At least one preferred embodiment utilizes a pigment (red, blue, yellow, green, etc.), either organic or inorganic, in an effective amount of between 0.01 to 5 percent by weight, more preferably from between about 0.1 to 3 percent by weight, and most preferably from between about 1 to about 2 percent by weight. The composition of Example 1 utilized 1.0 percent by weight of pigment (red, blue, yellow, etc.), or a water-dispersible titanium dioxide pigment for color and stability.

A thickener may optionally be added to control the application properties of the coating composition. Preferred thickeners include the acrylic polymers (sodium polyacrylate, Carbopol EZ-2), Polyox WSR (high mol. wt. polymers of ethylene oxide) from Union Carbide, organoclay such as Bentone from Rheox, etc. Other thickeners considered applicable include xanthan gums, guar gums, polyacrylic acid, polysaccharides, fillers such as silica, cellulose, wood flour, clays, etc. The preferred embodiment of Example 1 includes a thickening agent in an effective amount of from about 0.01 to about 5 percent by weight, more preferably from about 0.1 to 2 percent by weight. The formulation of Example 1 includes about 0.1 to 1 percent by weight and most preferably about 0.5 percent by weight of an acrylic polymer.

A antifoamer such as a high mol. wt. silicone oil solubilized in a light petroleum solvent may be added as an option in an effective amount of up to about 1 percent by weight, and more preferably from about 0.01 to 0.1 percent by weight in the formulation of Example 1.

EVALUATION RESULTS OF PEELABLE COATING IN EXAMPLE 1

The films were cast using a drawdown bar (15, 30 and 50 mil) onto an automotive paint panel and let dry in ambient temperature and humidity. The resulting films were flat, smooth and glossy, with no or very little amount of tiny bubbles trapped in it. The panel was then immersed in tap water and examined at selected intervals to determine if any of the component leached out. No color change of water was found during the test, and water did not show any impact on the film's integrity. The films were also heated to 150° F. for 72 hours and then taken out from the oven and dipped in cool tap water at about 18° C. No adverse effects were demonstrated on the film coating which remained on the painted substrate.

The peelabilty of the above-mentioned films were excellent, which could be peeled away from the substrate as a whole piece. The film was strong and exhibited elasticity, memory, and resilience.

Long-term peelability was demonstrated by letting the coated paint panel in the open-air environment for a certain amount of time, and then peeled off from the substrate, and the surface of the substrate was evaluated both visually and with a microscope. Coatings of 200 days in open-air environment were peelable from the substrate as a whole piece, and the film surface was still smooth and glossy. No apparent fading of the color was noticed for the coatings in open-air environment for 200 days, and no surface damage on the substrate was noticed.

A preferred embodiment of a water resistant, peelable, protective and decorative clear or pigmented water based polymeric dispersion coating composition producing a three-dimensional foamy film of about ¼ in thick for use on a variety of substrates, including automotive paints is set forth in Example 2, as follows:

EXAMPLE 2

| INGREDIENT | PERCENT BY WEIGHT |
|---|---|
| Aqueous polyurethane dispersion | 75.0–98.0 |
| Release agent | 0.1–5.0 |
| Hydrocarbon propellant | 5.0–15.0 |
| Surfactant | 0.0–5.0 |
| Pigment (red, blue, yellow, etc.) | 0.0–5.0 |
| Thickening agent | 0.1–2.0 |
| Anti-skinning agent | 0.0–0.2 |
| Solvent (optional) | 0.0–5.0 |

Figure 2:
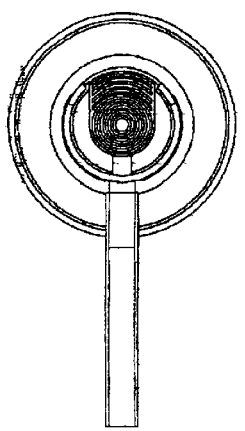
FIG. 2 is a top view of FIG. 1.
Figure 4:
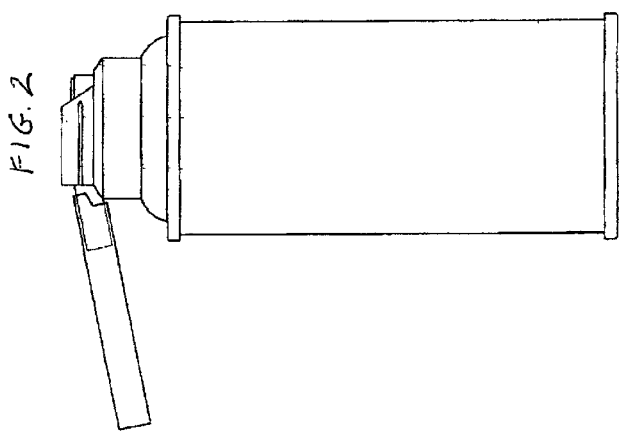
FIG. 4 is a side view of the entire container, dispenser, and nozzle for the expandable foam container of FIG. 1.
Figure 6:
FIG. 6 is a perspective view showing a portion of generally cylindrical piece of strand extruded from the expanded foam and showing the smooth outer surface and porous interior structure thereof.
Figure 1:
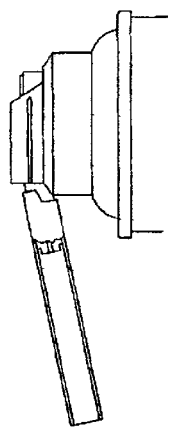
FIG. 1 is a partial perspective view of a expandable foam container, dispenser, and nozzle.
Figure 3:
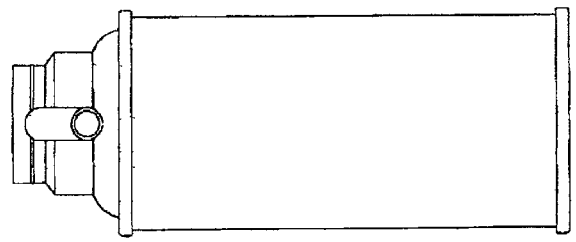
FIG. 3 is a front view of FIG. 1.

The aqueous polyurethane dispersion was mixed with the rest of the constituents except the propellant in a container, and then the mixture was transferred into an aerosol can where the pressurized liquid propellant was forced into the said aerosol can to mix with the said mixture. A regular spray nozzle with a push-down button, or with a push-down cap, may be used to apply the coating, and more preferably, an extension tube may be added onto the snout of the push-down button or cap to control the size and shape of the coating, and offer more structural design to the coating. The extension tube may be tapered at the opening and extending outwardly at a constant dimension as shown in FIG. 1, or spread in a cone or flat "V" shaped nozzle to control the spread or width, and depth of the expansion of the foam depending upon the application. Within seconds after application, the expandable foam will assume shape and form a skin on the exterior holding in the gas and forming a porious interior matrix as shown in FIG. 2, providing structural strength to the resulting cord, strand, or other graphic art or the selected dimensions.

The preferred water based compositions include an effective amount of an aqueous polyurethane resin dispersion. The aqueous polyurethane dispersion is a waterborne, colloidal dispersion of aliphatic urethane. The average molecular weight is between about 50,000 and 5,000,000, more preferably between about 500,000 and 1,000,000. The foamy coating embodiment preferably utilizes a resin content of polyurethane dispersion above 40 percent solids, or non-volatile (NV) components, in order to prevent unwanted porosity and prevent collapse of the foam upon application. Moreover, the three-dimensional aspect of the preferred embodiment is preserved by using a polyurethane dispersion of about 40 percent solids or greater, producing a coating having structural integrity from the moment of application to weeks after the application of the coating to the substrate. The aqueous polyurethane ranges in amount from about 75 to 98 percent by weight, and more preferably from about 80 to 95 percent by weight. About 89 percent by weight of the aqueous polyurethane dispersion was used in Example 2.

Water in the aqueous polyurethane dispersion itself provides enough solvency/dispersing medium for the rest of the components, therefore, no extra solvent is necessary in the formulation. However, an optional amount of water or other polar solvent up to 5 percent by weight may be added into the formulation to cut down cost, to enhance the evaporation of the solvent in the system, and/or to enhance the solubility of other components in the mixture.

The preferred embodiments of the present invention use a nonfloronated propellant, although pressurized air, $N_2$, $CO_2$ may also be used. A commercial liquid hydrocarbon propellant which is compatible with the preferred composition may be selected from the group of A-31, A-46, A-70, or A-108 propane/isobutane blends, with A-46 and A-70 being the most preferred propellant for use with particular compositions. The composition may contain up to 25 weight percent of propellant, and more preferably from 5 to 20 weight percent of propellant. About 7.5 percent by weight of the propellant A-46 was used in Example 2.

A release agent such as a soy lecithin in an amount ranging from about 0.1 to about 5 percent by weight, more preferably from about 1 to 3 percent by weight, is utilized in the aqueous polyurethane dispersion. Other water soluble or dispersible release agents described heretofore may be utilized with or substituted for the soy lecithin. About 2 percent release agent was use in the embodiment of Example 2.

Additional preferred compositions of the above formulation may be formulated to provide foamy peelable coatings with particular characteristics by blending the compounds as follows.

The above-composition may be formed as a clear foamy peelable coating composition or tinted with a dye or pigment in an effective amount of up to 5.0 percent by weight. At least one preferred embodiment utilizes a pigment (red, blue, yellow, green, etc.), either organic or inorganic, in an effective amount of between 0.01 to 5 percent by weight, more preferably from between about 0.1 to 3 percent by weight, and most preferably from between about 1 to about 2 percent by weight. The composition of Example 2 utilized 1.0 percent by weight of red, blue, or yellow pigment, or a water-dispersible titanium dioxide pigment for color and stability.

A profoamer may be added into the formulation too enhance the foaming ability during applying the coating. Surfactants are used for this purpose, which can be either anionic, cationic, amphoteric or nonionic. Typical foaming agents include alkanolamides, silicone glycols, alkyl benzene sulfonates, alcohol ethoxylated, phosphate esters, betaines, alkylphenol ether sulfates, alkylaryl sulfonates. Super amide may function as a foam enhancer and stabilizer, so it is preferably used in the embodiment of the foamy coating formulation. In the present Example 0.5 percent by weight of the super amide is used as the preferred profoamer.

A thickening agent may optionally be added to control the application properties of the coating composition. Preferred thickeners for the aqueous polyurethane based dispersion include the acrylic polymers (sodium polyacrylate, Carbopol EZ-2), Polyox WSR (high mol. wt. polymers of ethylene oxide) from Union Carbide, organoclays such as Bentone, etc. Other thickeners considered applicable include xanthan gums, guar gums, polyacrylic acid, polysaccharides, fillers such as silica, cellulose, wood flour, clays, etc. The preferred embodiment of Example 2 includes a thickening agent in an effective amount of from about 0.01 to about 5 percent by weight, and more preferably from about 0.1 to 2 percent by weight. Moreover, the water-soluble or solvent-soluble thickeners may be used in conjunction with the above-said solvent in the formulation. The formulation of Example 2 includes about 0.2 to 0.3 percent by weight of thickening agent.

An anti-skinning agent may be added to the formulation. An effective amount of an anti-skinning agent such as Exkin No. 2 up to 1 percent by weight may be utilized in a preferred embodiment, and preferably from about 0.01 to about 0.2 weight percent. In the present Example about 0.05 percent of the anti-skinning agent, preferably Exkin No. 2, was used.

EVALUATION OF PEELABLE FILM IN EXAMPLE 2

The foamy films were applied onto an automotive paint panel using a push-down cap with a extension tube connected to the snout and let dry in ambient temperature and humidity. The thickness of the foamy coating can range from 0.1 to 1 inch, more preferable 0.25 to 0.5 inch. The resulting dry films were foamy, three-dimensional, with a semi-glossy outside surface, and with the bulk structure sponge like. The panel was then immersed in tap water and examined at selected intervals to determine if any of the component leached out. No color change of water was found during the test, and water did not show any impact on the film's integrity. The surface tension of the water was reduced a little, indicating that some of the surfactant was leaching out. Since the foam structure had already be formed and become rigid through air dry, the leaching out of the surfactant didn't affect the dry film structure at all. The films were also heated to 150° F. for 72 hours and then taken out from the oven and dipped in cool tap water at about 18° C. No adverse effects were demonstrated on the film coating which remained on the painted substrate.

The peelabilty of the above-mentioned films were excellent, which could be peeled away from the substrate as a whole piece. The film was foamy and very elastic.

Long-term peelability was demonstrated by letting the coated paint panel in the open-air environment for a certain amount of time, and then peeled off from the substrate, and the surface of the substrate was evaluated both visually and with a microscope. Coatings of 200 days in open-air environment were peelable from the substrate as a whole piece. No apparent fading of the color was noticed for the coatings in open-air environment for 200 days, and no surface damage on the substrate was noticed.

Resins other than polyurethane dispersions can also be used as film former in the formulation. A preferred embodiment of a water resistant, peelable, protective and decorative clear or pigmented solvent-based polymeric coating composition for use on a variety of substrates, including automotive paints is set forth in Example 3, resulting in a film of abut 30 mils, as follows:

EXAMPLE 3

| INGREDIENT | PERCENT BY WEIGHT |
| --- | --- |
| Vinyl toluene acrylate copolymer resin | 27.0–30.0 |
| Aromatic solvent | 12.0–15.0 |
| Aliphatic solvent | 38.0–40.0 |
| Pigment (red, blue, yellow, etc.) | 3.0–5.0 |
| Polypropylene Glycol | 5.0–7.0 |
| 2-Ethylhexyldiphenyl phosphate | 6.0–9.0 |
| Wood flour | 0.1–2.0 |

The solvents were mixed together and the resin and pigment(s) were added to the solution at about 120° F. over a period of about two hours. The remaining constituents were added thereafter. An important consideration is the Kauri-Butanol value of the peelable coating composition which measures the aromaticity of the film components. If the aromaticity is too high the solvent carrier of the peelable coating will tend to dissolve certain substrates. Thus, the peelable coating must dry quickly before dissolving substrates susceptible to the solvent used as the carrier in a selected composition.

Preferred compositions include an effective amount of a resin soluble in aliphatic and/or aromatic solvents such as a vinyl toluene acrylate copolymer resin in an amount ranging from about 10 to about 50 percent by weight, more preferably from about 20 to 40 percent by weight, and most preferably from about 25 to 35 percent by weight.

An effective amount of an aromatic solvent, such as xylene, aliphatic solvent, such as heptane, or combination thereof in an amount ranging from about 20 to about 90 percent by weight, more preferably from about 40 to 80 percent by weight, and more preferably from about 50 to 75 percent by weight is also included in the composition. Alternatively, an combination of an aliphatic solvent in an effective amount ranging from between 0.01 to about 90 percent by weight, more preferably from about 20 to about 60 percent by weight and most preferably form about 30 to about 50 percent by weight may be utilized together with an effective amount of an aromatic solvent in an amount of between 0.01 to 90 percent by weight, more preferably from about 1 to 50 percent by weight, and most preferably from about 5 to 25 percent by weight.

Additional preferred compositions of the above formulation may be formulated to provide peelable coatings with particular characteristics by blending the compounds as follows.

A plasticizer, such as any set forth and described heretofore, and preferably a phosphate plasticizer is added in an effective amount of from between about 0.1 to about 40 percent by weight, more preferably from about 1 to 20 percent by weight, and most preferably from about 5 to about 15 percent by weight.

A filler such as set forth and described heretofore and preferably wood flour may optionally be added to the composition in an effective amount of between about 0.1 and 10 percent, more preferably between about 0.5 and 5 percent, and most preferably from between about 1 and 2 percent by weight.

A polyglycol such as polypropylene glycol may optionally be added to the peelable coating composition as a release agent in an effective amount of from between about 0.1 and 20 percent by weight, more preferably from between about 1 and 10 percent by weight, and most preferably of from between about 3 and 8 percent by weight of the total composition.

The above composition may be formed as a clear peelable coating composition or tinted with a dye/pigment in an effective amount of from between about 0.1 and 5.0 percent by weight. At least one preferred embodiment utilizes a day or pigment (red, blue, yellow, green, etc.) either organic or inorganic in an effective amount of between 0.1 to 10 percent by weight, more preferably from between about 1.0 and 5 percent by weight, and most preferably from between about 3 to about 5 percent by weight.

EXPERIMENTAL RESULTS AND EVALUATION OF PEELABLE FILM IN EXAMPLE 3

The films were cast using a drawdown bar (15, 30 and 50 mil) onto an automotive paint panel and let dry in ambient temperature and humidity. The resulting films were flat and smooth, with little amount of tiny bubbles trapped in it. The panel was then immersed in tap water and examined at selected intervals to determine if any of the component leached out. No color change of water was found during the test, and water did not show any impact on the film's integrity. The films were also heated to 150° F. for 72 hours and then taken out from the oven and dipped in cool tap water at about 18° C. No adverse effects were demonstrated on the film coating which remained on the painted substrate.

The peelabilty of the above-mentioned films were excellent, which could be peeled away from the substrate, although the film integrity could not be preserved completely during peeling. The film was a little brittle compared with the film formed by polyurethane resin.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A flat peelable coating composition, consisting essentially of a blend of:
   an effective amount of an aqueous polyurethane dispersion resin having an average molecular weight of between 50,000 to 5,000,000 containing at least 40 percent by weight solids contents;
   solvent selected from the group consisting of water, ethyl alcohol, methyl alcohol, isopropyl alcohol, and butyl alcohol, in an amount ranging from about 5 to 30 percent by weight of the total weight percent of the composition;
   a release agent in an amount of from between 0.1 and 10 percent of the total weight percent of the composition, said release agent being selected from the group consisting of soy lecithin, organosilicone fluids, nonylphenoxypoly-(ethyleneoxy)ethanol, oleic acid polyethylene glycol monostearate, petrolatum, sodium alkyl benzene, sulfonates, siloxanes, polyglycols, silicone surfactants, polyvinyl alcohol resins, paraffin and polymeric waxes, and synthetic waxes including low molecular weight polyethylene waxes; and
   wherein said aqueous polyurethane dispersion resin particles are dispersed in said solvent and applied to a single substrate in a single layer which upon curing provides a nonsoluble water resistant coating having a smooth surface.

2. The peelable coating of claim 1 including a dye or pigment in an effective amount of from 0.01 to 10.0 percent by weight.

3. The peelable coating of claim 1 including a thickening agent in an effective amount of from 0.01 to 5.0 percent by weight.

4. The peelable coating of claim 1 including an antifoam in an effective amount of from 0.01 to 1.0 percent by weight, selected from the group consisting of alkanolamides, silicone glycols, alkyl benzene sulfonates, alcohol ethoxylated, phosphate esters, oleates, betaines, alkylphenol ether sulfates, alkylaryl sulfonates, fatty acids, soy lecithin, anionic, cationic, amphoteric, or nonionic surfactants, and combinations thereof.

5. A peelable coating composition, consisting essentially of a blend of:
   an effective amount of an aqueous polyurethane dispersion resin having an average molecular weight of between 50,000 to 5,000,000 containing at least 40 percent by weight solids contents;
   at least one release agent in an amount of from between 0.1 and 5.0 percent of the total weight percent of the composition, said release agent being selected from the group consisting of soy lecithin, organosilicone fluids, nonylphenoxypoly-(ethyleneoxy)ethanol, oleic acid polyethylene glycol monostearate, petrolatum, sodium alkyl benzene, sulfonates, siloxanes, polyglycols, silicone surfactants, polyvinyl alcohol resins, paraffin and polymeric waxes, and synthetic waxes including low molecular weight polyethylene waxes, and combinations thereof; and
   a surfactant in an effective amount of from 0.01 to 10.0 percent by weight, selected from the group consisting of alkanolamides, silicone glycols, alkyl benzene sulfonates, alcohol ethoxylated, phosphate esters, oleates, betaines, alkylphenol ether sulfates, alkylaryl sulfonates, fatty acids, soy lecithin, anionic, cationic, amphoteric, or nonionic surfactants, and combinations thereof;
   wherein said aqueous polyurethane dispersion resin particles are dispersed and applied to a substrate in a single layer which upon curing provides a nonsoluble water resistant film having a smooth surface.

6. The peelable coating of claim 5 including a dye or pigment in an effective amount of from 0.01 to 10.0 percent by weight.

7. The peelable coating of claim 5 including a thickening agent in an effective amount of from 0.01 to 5.0 percent by weight.

8. The peelable coating of claim 5 including an antiskinning agent in an effective amount of from 0.01 to 1.0 percent by weight.

9. The peelable coating of claim 5 including a solvent in an effective amount of from 0.01 to 5.0 percent by weight.

10. A peelable coating composition, consisting essentially of a blend of:
    an effective amount of an aqueous polyurethane dispersion resin having an average molecular weight of between 50,000 to 5,000,000 containing at least 40 percent by weight solids contents:
    an effective amount of a release agent in an amount of from between 0.1 and 5 percent of the total weight percent of the composition, said release agent being selected from the group consisting of soy lecithin, organosilicone fluids, nonylphenoxypoly-(ethyleneoxy)ethanol, oleic acid polyethylene glycol monostearate, petrolatum, sodium alkyl benzene, sulfonates, siloxanes, polyglycols, silicone surfactants, polyvinyl alcohol resins, paraffin and polymeric waxes, and synthetic waxes including low molecular weight polyethylene waxes, and combinations thereof;
    an effective amount of a plasticizer in an amount of up to 20 percent by weight selected from the group consisting essentially of a polyvinyl alcohol, a cellulose, a polyglycol, a phthalate, an adipate, a sebacate ester, a glyceryl tri(acetoxystearate), an epoxidized soybean oil, an epoxidized linseed oil, an n-butyl benzene sulfonamide, an aliphatic polyurethane, a polyester glutarate, a triethylene glycol, a caprate/caprylate, a long chain alkyl ether, a dialkyl diester, a glutarate, an epoxy plasticizer, a polyester based on adipic acid, a hydrogenated dimer acid, a distilled dimer acid, a polymerized fatty acid trimer, an ethyl ester of hydrolyzed collagen, an isostearic acid, a sorbian oleate, a cocoyl hydrolyzed keratin, a lanolin oil, a dialkyl adipate, an alkylaryl phosphate, an alkyl diaryl phosphate, a modified triaryl phosphate, a triaryl phosphate, a butyl benzyl phthalate, an octyl benzyl phthalate, an alkyl benzyl phthalate, a dibutoxy ethoxy ethyl adipate, a 2-ethylhexyldiphenyl phosphate, a dibutoxy ethoxy ethyl formyl, a diisopropyl adipate, a diisopropyl sebacate, an isodecyl oleate, a neopentyl glycol dicaprate, a neopenty glycol diotanoate, an isohexyl neopentanoate, an ethoxylated lanolin, a polyoxyethylene cholesterol, a propoxylated (2 moles) lanolin alcohols, a propoxylated lanoline alcohol, an acetylated polyoxyethylene derivative of lanoline, a dimethylpolysiloxane, a glycerine, a polyethylene glycol, a dibutyl phthalate, a 2,2,4-trimethyl-1,3-pentanediol monoisobutyrate, and a diisononyl phthalate in an amount of from 0.1 to 20 percent by weight of the total weight of the composition; and wherein said aqueous polyurethane dispersion resin particles are dispersed and applied to a substrate in a single layer which upon curing provides a nonsoluble water resistant coating having a smooth surface.

11. The peelable composition of claim 10, wherein said effective amount of a release agent is from 0.1 to 5.0 percent by weight.

12. The peelable composition of claim 10, wherein said release agent is soy lecithin.

13. The peelable composition of claim 1, wherein said release agent is soy lecithin.

14. The peelable composition of claim 1, wherein said an effective amount of a said release agent is up to 5.0 percent by weight.

15. The peelable composition of claim 10 including an effective amount of a solvent selected from the group consisting of water, ethyl alcohol, methyl alcohol, isopropyl alcohol, butyl alcohol, and combinations thereof.

16. The peelable composition of claim 15 wherein said effective amount of said solvent is up to 10 percent by weight in addition to said water of said aqueous polyurethane dispersion.

17. The peelable composition of claim 5, wherein said effective amount of a release agent is from 0.1 to 3.0 percent by weight.

18. The peelable composition of claim 1, wherein said release agent is soy lecithin.

19. The peelable composition of claim 10, including an effective amount of a surfactant.

20. The peelable composition of claim 19, wherein said surfactant is selected from the group consisting of alkanolamides, silicone glycols, alkyl benzene sulfonates, alcohol ethoxylated, phosphate esters, betaines, alkylphenol ether sulfates, alkylaryl sulfonates, fatty acids, soy lecithin, and combinations thereof.

21. The peelable composition of claim 19 wherein said effective amount of said surfactant is up to 10 percent by weight.

22. The peelable composition of claim 19, wherein said surfactant is a nonionic surfactant.

23. The peelable composition of claim 10 including an effective amount of a solvent.

24. The peelable composition of claim 23 wherein said effective amount of said solvent is up to 10 percent by weight in addition to the water contained in said aqueous polyurethane dispersion.

25. The peelable composition of claim 10 further comprises a polyglycol.

26. The peelable composition of claim 25 wherein said effective amount of a polyglycol is from between 0.1 and 20.0 percent by weight.

27. The peelable composition of claim 25 wherein said polyglycol is polypropylene glycol.

28. The peelable composition of claim 10 wherein said peelable coating is from 20 to 40 mils in thickness.

29. The peelable composition of claim 10 wherein said peelable coating is of up to 80 mils in thickness.

* * * * *